United States Patent
Nakamura et al.

(10) Patent No.: US 8,408,348 B2
(45) Date of Patent: Apr. 2, 2013

(54) SNOWMOBILE AND ENGINE FOR SNOWMOBILE

(75) Inventors: Hideto Nakamura, Shizuoka (JP); Toshio Hayashi, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 632 days.

(21) Appl. No.: 12/550,607

(22) Filed: Aug. 31, 2009

(65) Prior Publication Data

US 2010/0071981 A1    Mar. 25, 2010

(30) Foreign Application Priority Data

Aug. 29, 2008 (JP) ................... 2008-222179
Aug. 29, 2008 (JP) ................... 2008-222634
Aug. 29, 2008 (JP) ................... 2008-222638

(51) Int. Cl.
*B62M 27/02* (2006.01)
*B60K 5/00* (2006.01)

(52) U.S. Cl. .............. 180/182; 180/190; 180/291

(58) Field of Classification Search .......... 180/182, 180/186, 190, 291, 297

See application file for complete search history.

(56) References Cited

U.S. PATENT DOCUMENTS

| | | | | |
|---|---|---|---|---|
| 4,008,777 A | * | 2/1977 | Juto et al. | 180/182 |
| 4,613,006 A | * | 9/1986 | Moss et al. | 180/9.25 |
| 5,172,786 A | * | 12/1992 | Ishibashi et al. | 180/190 |
| 5,474,146 A | * | 12/1995 | Yoshioka et al. | 180/184 |
| 5,685,387 A | * | 11/1997 | Rioux et al. | 180/190 |
| 5,957,230 A | * | 9/1999 | Harano et al. | 180/68.4 |
| 6,234,263 B1 | * | 5/2001 | Boivin et al. | 180/184 |
| 6,547,021 B1 | * | 4/2003 | Kai et al. | 180/190 |
| 7,182,165 B1 | * | 2/2007 | Keinath et al. | 180/185 |
| 2004/0182621 A1 | * | 9/2004 | Yatagai et al. | 180/182 |
| 2007/0102215 A1 | * | 5/2007 | Pichler et al. | 180/190 |
| 2007/0114085 A1 | * | 5/2007 | Girouard et al. | 180/190 |
| 2007/0246268 A1 | * | 10/2007 | Snyder et al. | 180/9.44 |
| 2007/0251745 A1 | * | 11/2007 | Codere et al. | 180/210 |
| 2007/0284171 A1 | * | 12/2007 | Okada et al. | 180/182 |
| 2009/0007878 A1 | * | 1/2009 | Korenjak et al. | 123/193.5 |

FOREIGN PATENT DOCUMENTS

JP    2005002877 A    1/2005

* cited by examiner

*Primary Examiner* — Anne Marie Boehler
*Assistant Examiner* — Maurice Williams
(74) *Attorney, Agent, or Firm* — Troutman Sanders LLP

(57) ABSTRACT

A snowmobile having improved drive stability of the vehicle body during steering includes a pair of left and right skis on a front side of the vehicle body, a steering shaft disposed on a front of a saddle type seat for steering the skis, an engine mounted in a cowling that covers the front side of the vehicle body, and a crawler disposed on a rear side of the vehicle body for driving the snowmobile. The engine is mounted by inclining a cylinder axis thereof forward, and the steering shaft is disposed on the front of a cylinder head of the engine.

15 Claims, 10 Drawing Sheets

SNOWMOBILE AND ENGINE FOR SNOWMOBILE

CROSS-REFERENCE TO RELATED APPLICATIONS

This application is based upon and claims the benefit of priority of the prior Japanese Patent Application Nos. 2008-222179, filed on Aug. 29, 2008, 2008-222634, filed on Aug. 29, 2008 and 2008-222638, filed on Aug. 29, 2008, the entire contents of which are incorporated herein by reference.

BACKGROUND OF THE INVENTION

1. Field of the Invention

The present invention relates to a snowmobile including a pair of left and right skis on a front side of a vehicle body, steering the skis via a steering shaft disposed on a front of a saddle type seat, mounting an engine in a cowling that covers the front side of the vehicle body, and traveling by driving a crawler disposed on a rear side of the vehicle body, and an engine for snowmobile.

2. Description of the Related Art

Conventionally, there is known a snowmobile having an engine mounted thereon disposed by being inclined rearward with respect to a traveling direction of the snowmobile (for instance, refer to Patent Document 1). When the engine is inclined rearward, a gravity center of the engine shifts rearward, so that a gravity center position of the entire vehicle body and a gravity center position of the engine are close to each other, resulting that a driving stability during the steering can be improved.

Here, a structure of the snowmobile having the engine disposed by being inclined rearward will be briefly described with reference to FIG. 10. FIG. 10 is a side view of the conventional snowmobile. In FIG. 10, a forward (traveling direction) and a rearward of the snowmobile are respectively indicated by arrow Fr and arrow Rr.

The entire front side of a snowmobile 100 is covered by a cowling 101 (refer to dotted line shown in FIG. 10). In a space covered by the cowling 101, an engine room 102 surrounded by a plurality of frames is formed. In the engine room 102, an engine 103 is disposed by being inclined rearward as described above.

A fuel tank 104 is disposed behind the engine 103. Further, an occupant seat 105 is disposed behind the fuel tank 104. On the occupant seat 105, an occupant (refer to two-dot chain line shown in FIG. 10) who steers the snowmobile 100 is seated. On the lower side of the fuel tank 104 and the occupant seat 105, a track housing 106 is formed to be opened downward along the front and rear directions.

A crawler 107 is disposed on the lower side of the track housing 106. The crawler 107 is formed of a driving wheel, a coupled driving wheel, an intermediate wheel, and a track belt 111 circumscribed around the respective wheels. An output of the engine 103 is transmitted to the driving wheel via a CVT (Continuously Variable Transmission), which enables the track belt 111 to wind around the respective wheels.

Meanwhile, a pair of left and right steering skis 112 are provided in a steerable manner on the front of and below the engine 103. The steering skis 112 are connected to a steering handle 114 via a steering mechanism including a steering shaft 113. The steering shaft 113 is extended diagonally upward from the front side of the engine room 102 to the upper side of the engine room 102 while passing in front of the engine 103. On a tip of the upper side of the steering shaft 113, the steering handle 114 is disposed along a vehicle width direction. Further, on the front of the steering handle 114 and above the engine room 102, a headlight 115 (refer to dotted line shown in FIG. 10) is provided to illuminate in front of the snowmobile 100.

Meanwhile, if attention is paid to a periphery of the engine 103, on the front of a crankcase 116 of the engine 103, an oil filter 117 is disposed to protrude forward. Further, a starter motor 119 is disposed above the crankcase 116 of the engine 103 and behind a cylinder 118.

Note that in FIG. 10, a gravity center position Ge of the engine 103 (hereinafter, referred to as gravity center position of engine Ge) and a gravity center position Gc of the vehicle body when the occupant rides on the snowmobile 100 (hereinafter, referred to as gravity center position of vehicle body including occupant Gc) are indicated.

[Patent Document 1] Japanese Patent Application Laid-open No. 2005-2877

As described above, according to the conventional snowmobile 100, the engine 103 is disposed by being inclined rearward, so that as far as this point is concerned, the gravity center position of engine Ge can be shifted rearward as shown in FIG. 10.

However, in the conventional snowmobile 100, the fuel tank 104 is disposed behind the engine 103. Therefore, if the engine 103 is inclined rearward, the fuel tank 104 also has to be disposed by being moved rearward according thereto, and in accordance with this, the occupant seat 105 also has to be disposed rearward. Eventually, it is practically difficult to further reduce a distance between the gravity center position of engine Ge and the gravity center position of vehicle body including occupant Gc.

Further, a position at which the oil filter 117 is disposed also relates to a main cause why the distance between the gravity center position of engine Ge and the gravity center position of vehicle body including occupant Gc cannot be reduced. Specifically, since the oil filter 117 is disposed to protrude forward of the engine 103 as described above, other component parts have to be disposed so as not to interfere with the oil filter 117. Accordingly, the other component parts cannot be disposed close to the engine in order to avoid the interference with the oil filter 117, so that the gravity center position Ge of the engine being a heavy object and the gravity center position of vehicle body Gc are forced to be separated.

In addition, since the other components are disposed on the front of the oil filter 117, an exchange work of the oil filter 117 is not easy, which is a problem.

Further, a position at which the starter motor 119 is disposed also relates to the main cause why the distance between the gravity center position of engine Ge and the gravity center position of vehicle body including occupant Gc cannot be reduced. Specifically, since the starter motor 119 is disposed above the crankcase 116 of the engine 103 and behind the cylinder 118 as described above, other component parts have to be disposed so as not to interfere with the starter motor 119. Accordingly, the other component parts cannot be disposed close to the engine in order to avoid the interference with the starter motor 119, so that the gravity center position Ge of the engine being a heavy object and the gravity center position of vehicle body Gc are forced to be separated.

In addition, since the other component parts are disposed around the starter motor 119, maintenance of the starter motor is not easy, which is a problem.

SUMMARY OF THE INVENTION

The present invention has been made in view of the above-described problems, and an object thereof is to provide a snowmobile capable of remarkably improving a driving stability by favorably setting gravity center positions.

Further, the present invention has an object to provide an engine for snowmobile in which an exchange work of an oil filter can be conducted easily.

Further, the present invention has an object to provide an engine for snowmobile in which maintenance of a starter motor can be conducted easily.

A snowmobile of the present invention including a pair of left and right skis on a front side of a vehicle body, steering the skis via a steering shaft disposed on a front of a saddle type seat, mounting an engine in a cowling that covers the front side of the vehicle body, and traveling by driving a crawler disposed on a rear side of the vehicle body, is characterized in that the engine is mounted by inclining a cylinder axis thereof forward, and the steering shaft is disposed on the front of a cylinder head of the engine.

Further, it is characterized in that a steering handle attached to an upper end of the steering shaft is disposed on the front of a vertical line passing through an axial center of a crankshaft of the engine, in side view.

Further, it is characterized in that the cylinder head of the engine is inclined forward to be positioned below a horizontal line passing through an upper end of a track housing that covers the crawler, in side view.

Further, it is characterized in that an air box is disposed above the cylinder head of the engine, and a fuel tank is disposed above a crankcase of the engine.

Further, it is characterized in that a headlight is disposed on the front of the cylinder head of the engine, in contraposition to the cylinder head.

An engine for snowmobile of the present invention provided in a snowmobile including a pair of left and right skis on a front side of a vehicle body, steering the skis via a steering shaft disposed on a front of a saddle type seat, mounting the engine in a cowling that covers the front side of the vehicle body, and traveling by driving a crawler disposed on a rear side of the vehicle body, is characterized in that it is mounted by inclining a cylinder axis thereof forward, and an oil filter is disposed below an axial center of a crankshaft in side view.

Further, it is characterized in that the oil filter is disposed on a side surface of the engine being an opposite side to a side on which a Continuously Variable Transmission of the engine is disposed.

Further, it is characterized in that a magneto device is disposed on the side surface of the engine being the opposite side to the side on which the Continuously Variable Transmission of the engine is disposed, and the oil filter is disposed below a magneto cover that covers the magneto device.

Further, it is characterized in that an attachment surface of the oil filter is formed by being directed in the lateral direction.

An engine for snowmobile of the present invention provided in a snowmobile including a pair of left and right skis on a front side of a vehicle body, steering the skis via a steering shaft disposed on a front of a saddle type seat, mounting the engine in a cowling that covers the front side of the vehicle body, and traveling by driving a crawler disposed on a rear side of the vehicle body, is characterized in that it is mounted by inclining a cylinder axis thereof forward, and a starter motor is disposed on the front of and above an axial center of a crankshaft in side view.

Further, it is characterized in that an air box is disposed above a cylinder head of the engine, a fuel tank is disposed above a crankcase of the engine, and the starter motor is disposed at a position surrounded by the air box, the fuel tank, and the engine.

It is characterized in that the fuel tank is disposed above the engine, a recessed portion is formed on the fuel tank, and mounting bosses for fixing the starter motor are formed by being directed to the recessed portion.

It is characterized in that the starter motor is disposed at a position not protruding upward from a virtual plane connecting an upper end portion of the crankcase of the engine and an upper end portion of the cylinder head of the engine.

DETAILED DESCRIPTION OF THE PREFERRED EMBODIMENTS

Hereinafter, a snowmobile according to the present embodiment will be described based on the drawings.

Figure 1:
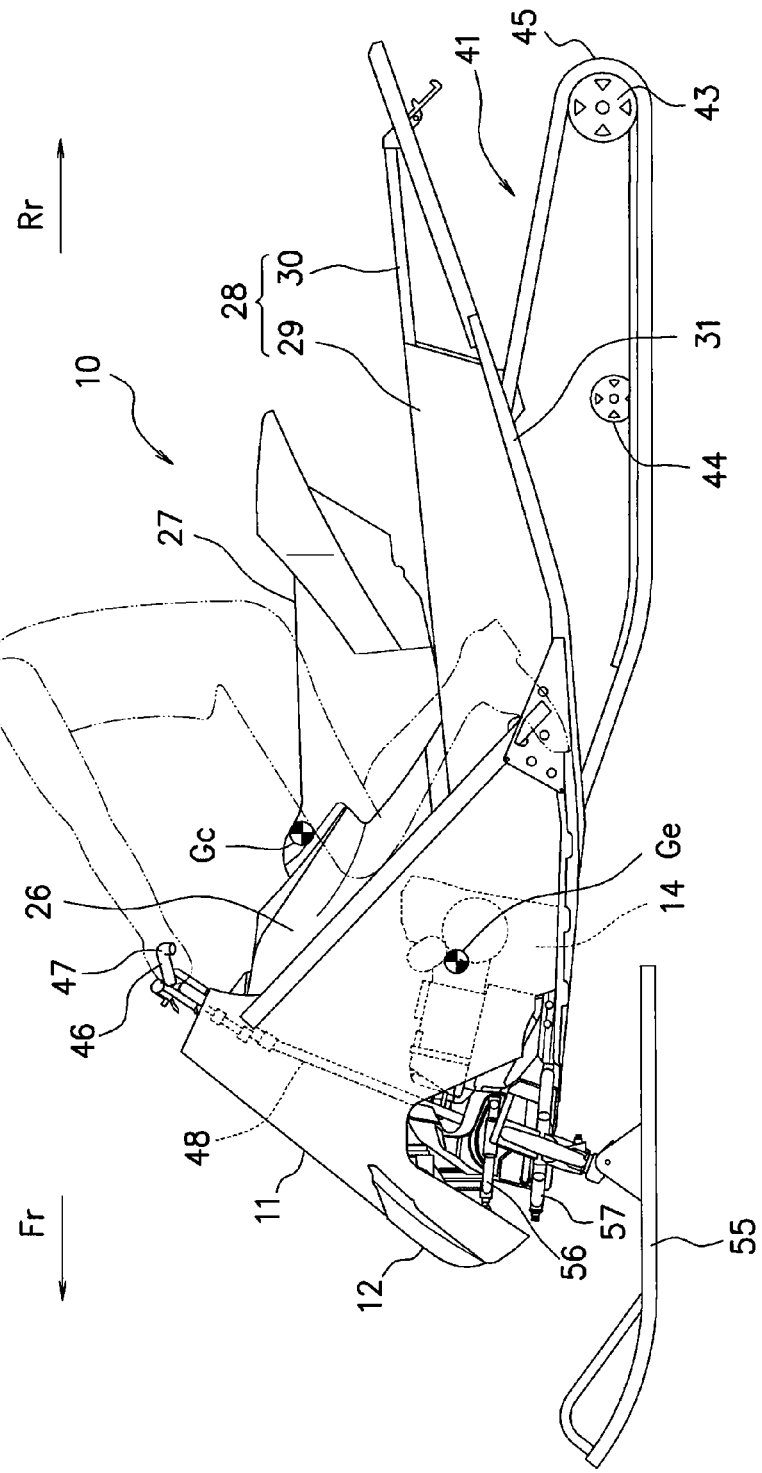
FIG. 1 is a left side view of a snowmobile according to the present embodiment.
Figure 2:
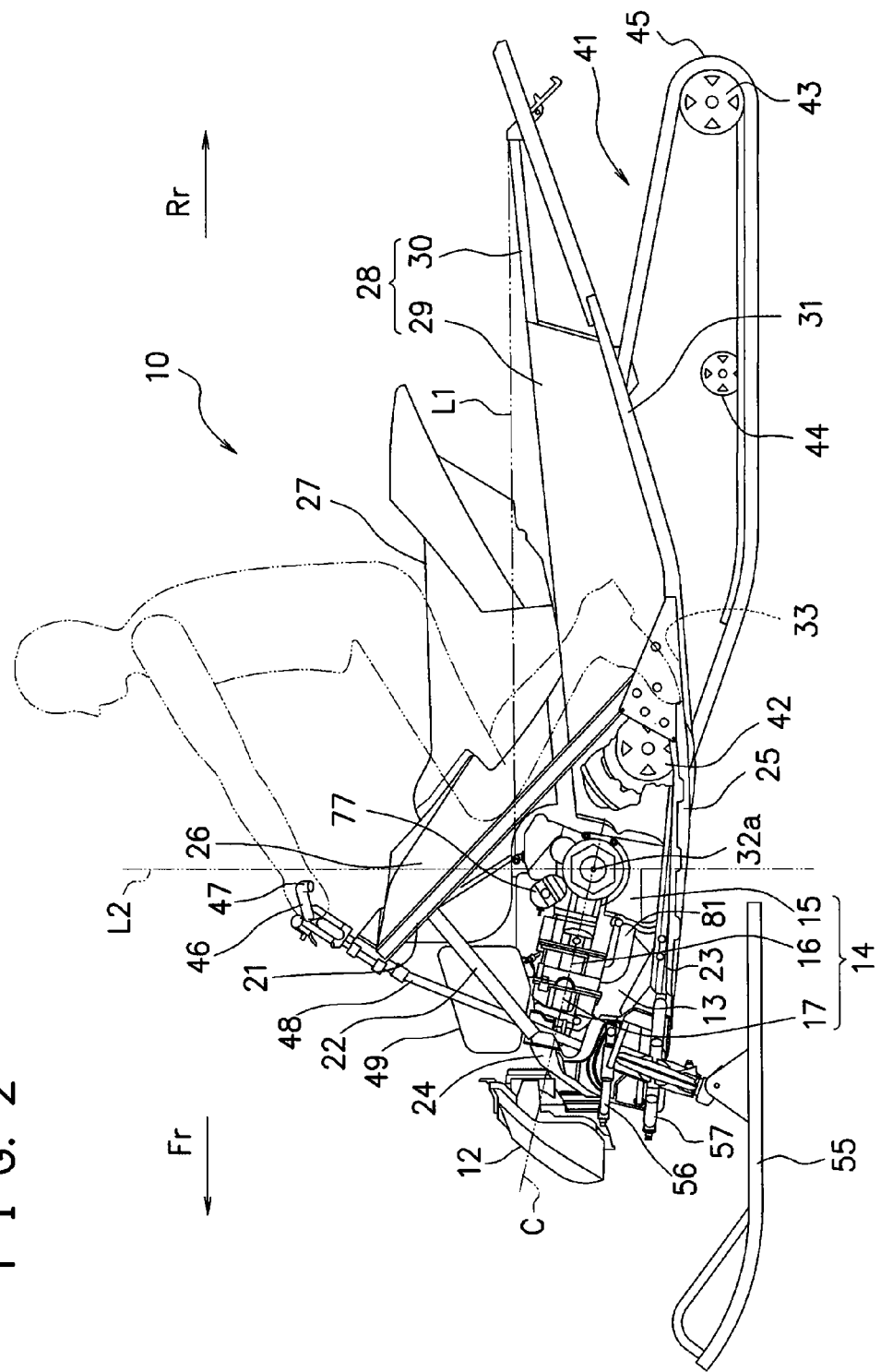
FIG. 2 is a left side view of the snowmobile in a state in which a cowling according to the present embodiment is removed.
Figure 3:
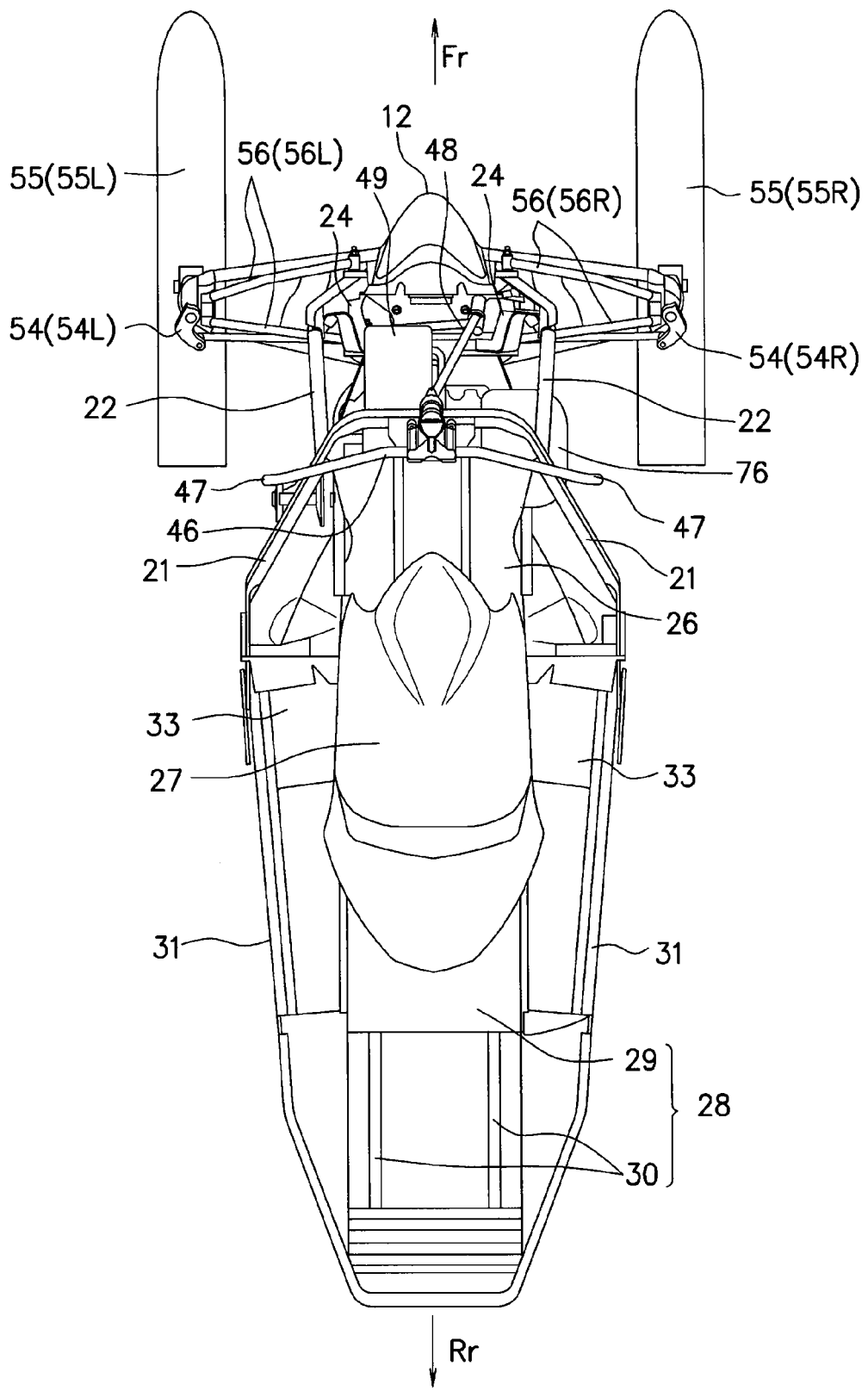
FIG. 3 is a plan view of a state in which the cowling according to the present embodiment is removed.
Figure 4:
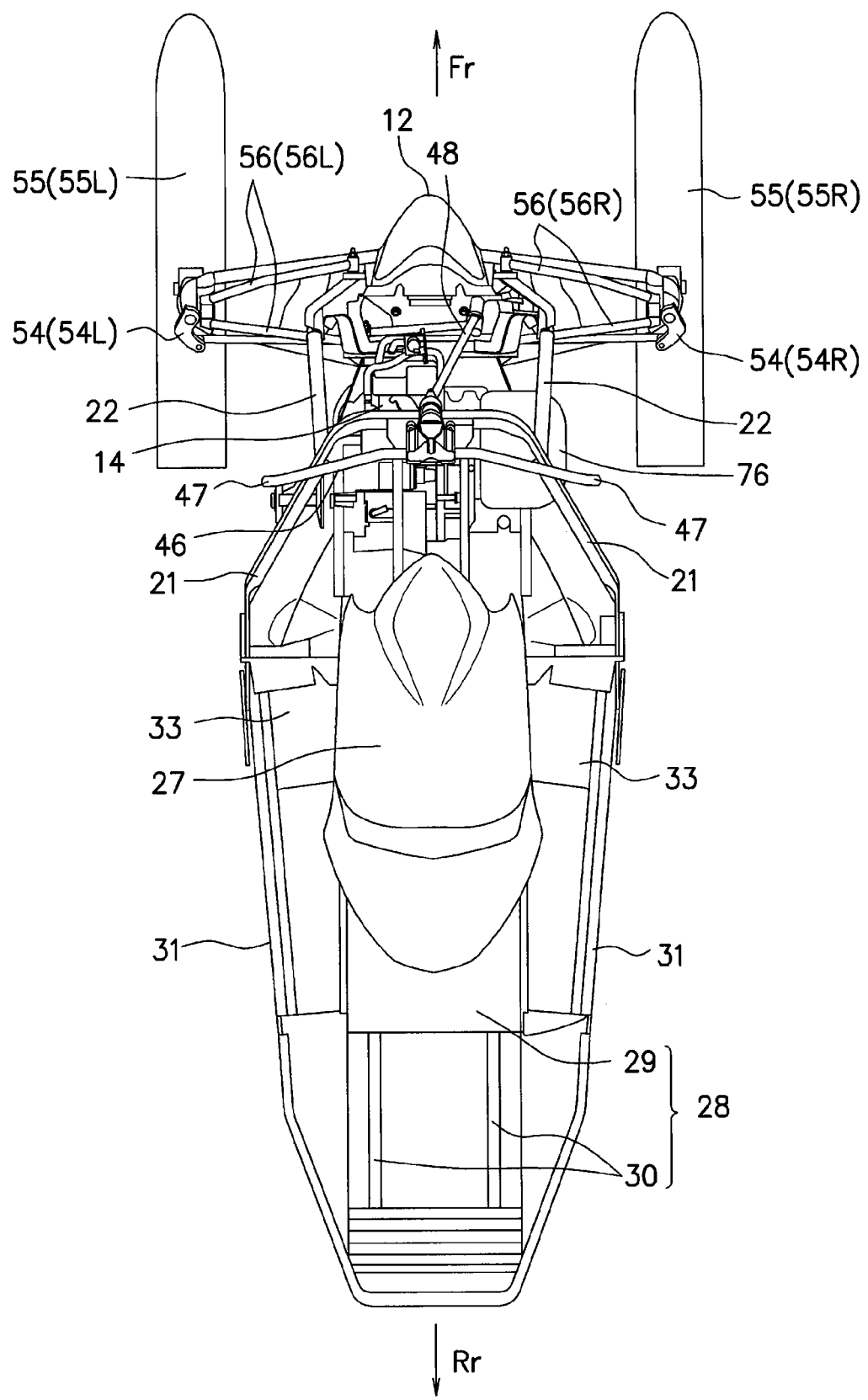
FIG. 4 is a plan view of a state in which an air box according to the present embodiment is removed.

At first, a structure of the snowmobile will be described with reference to FIG. 1 to FIG. 4. FIG. 1 is a side view showing a structure of the snowmobile according to the present embodiment. FIG. 2 is a side view of a state in which a cowling that covers a front side of a vehicle body of the snowmobile shown in FIG. 1 is removed. FIG. 3 is a plan view of the snowmobile from which the cowling is removed. FIG. 4 is a plan view of a state in which an air box of the snowmobile shown in FIG. 3 is removed. Note that in the drawings, a forward (traveling direction) and a rearward of a snowmobile 10 are respectively indicated by arrow Fr and arrow Rr.

As shown in FIG. 1, the snowmobile 10 is formed such that a cowling 11 covers a front side and lateral sides of a vehicle body with a smoothly continued curved surface so that an appearance of the vehicle body is adjusted. On a front part and lower side of the vehicle body, a headlight 12 is provided so as to continue to a surface of the cowling 11. Further, as shown in FIG. 2, in a space covered by the cowling 11, an engine room 13 in which an engine 14 and the like are disposed is formed. Here, the engine 14 disposed in the engine room 13 is mounted by inclining a cylinder axis C of a cylinder 16 forward. Here, in the engine 14, the cylinder axis C is inclined forward close to a horizontal state. Concretely, the engine 14 is disposed so that the cylinder axis C shown in FIG. 2 makes an angle of substantially about 10 degrees relative to a horizontal plane.

When the engine 14 is inclined as described above, it is possible to lower a gravity center of the engine 14. Further, as shown in FIG. 4, the engine 14 is disposed by being offset toward the left side with respect to the traveling direction.

Here, as shown in FIG. 2, the engine 14 is structured by including a crankcase 15, the cylinder 16, and a cylinder head 17. In the crankcase 15, a crankshaft 32 (axial center 32a of the crankshaft is shown in FIG. 2) is extended in a vehicle width direction. A water-cooled 4-cycle single-cylinder engine, for instance, is supposed to be used as the engine 14 according to the present embodiment.

Further, as shown in FIG. 2, an air box 49 is disposed above the cylinder head 17 and the cylinder 16 of the engine 14. As shown in FIG. 3, the air box 49 is disposed by being offset toward the left side with respect to the traveling direction, similar to the engine 14. Further, on the right side of the engine 14 with respect to the traveling direction, a muffler 76 is disposed. The muffler 76 is connected to the engine 14 from a lower portion of the cylinder 16 via an exhaust pipe 81 (refer to FIG. 2). Details regarding the engine 14 and other component parts of the periphery of the engine 14 will be described later.

The aforementioned engine room 13 is formed by being surrounded by a plurality of frames such as a support frame 21, upper frames 22, and an under frame 23, as shown in FIG. 2. Here, the support frame 21 has a substantially U-shape or an angular shape as shown in FIG. 3, and is disposed by being extended downward from a substantially front top portion of the vehicle body toward a substantially lower portion of a center of the vehicle body so that later-described fuel tank and housing frame are positioned inside between the U-shaped frame. The support frame 21 is disposed by being inclined by an angle of substantially 45 degrees in side view.

Further, as shown in FIG. 2, a pair of left and right upper frames 22 are disposed from a middle of the support frame 21 to the forward and diagonally downward direction. The upper frames 22 are respectively connected to arm supporting members 24. Further, the under frame 23 is formed in a substantially horseshoe shape in plan view, and is disposed on a lower part of the vehicle body along a substantially horizontal direction. Right below the under frame 23, a flat plate 25 is disposed in a substantially horizontal state so as to block a horseshoe-shaped region of the under frame 23. The crankcase 15 of the engine 14 is mounted on the flat plate 25. Further, front portions of the under frame 23 are connected to the arm supporting members 24 via intermediate members, to thereby secure a connection stiffness among each of the frames.

Meanwhile, substantially rearward and diagonally upward of the engine 14, a fuel tank 26 is disposed along the front and rear directions. The fuel tank 26 is formed in a curved shape in which an upper surface thereof smoothly slides down as it goes rearward. A front side of the fuel tank 26 is disposed to cover over the cylinder 16 and the crankcase 15 of the engine 14. Specifically, the fuel tank 26 is moved forward as compared to the conventional one so that it comes close to the engine 14. This becomes possible because the space is formed above the cylinder 16 and the crankcase 15 of the engine 14 by inclining the cylinder axis C of the engine 14 forward. Note that a part of a lower surface of the fuel tank 26 is formed in an arc shape in order to avoid a contact with the crankcase 15. Further, a recessed portion 26c is formed on a part of the fuel tank 26 so that an operator can conduct maintenance of a later-described starter motor. The recessed portion 26c will be described later.

Behind the fuel tank 26, a saddle type seat 27 is disposed along the front and rear directions. The saddle type seat 27 is formed to have a size that allows an occupant who steers the snowmobile 10 to sit astride the seat. Here, since the aforementioned fuel tank 26 is disposed by being moved forward, the saddle type seat 27 is also disposed by being moved forward. Therefore, the occupant who sits on the saddle type seat 27 naturally sits further on the front side with respect to the vehicle body, and takes a riding position so that he/she comes close to the engine 14.

Below the saddle type seat 27 and behind the engine 14, a track housing 28 is disposed along the front and rear directions in a manner that a rear portion thereof slightly rises. The track housing 28 is structured by including a housing main body 29, and housing frames 30. The housing main body 29 is formed so that a lower portion thereof is opened along the front and rear directions. Further, the housing main body 29 is formed to have a size capable of covering a crawler 41.

Inside the housing main body 29, a pair of left and right housing frames 30 are formed to appropriately rise from front portions to rear portions thereof. The rear sides of the housing frames 30 are exposed from the housing main body 29 in the middle and at the proper portions thereof, and rear end portions are mutually connected in the vehicle width direction. The rear end portions of the housing frames 30 are positioned substantially above a rear end of the crawler 41. Note that in FIG. 2, a horizontal line L1 passing through an upper end of the track housing 28 is indicated, and the aforementioned cylinder head 17 of the engine 14 is positioned below the horizontal line L1.

Further, on both sides of the track housing 28, a pair of left and right side frames 31 are extended diagonally rearward from lower end portions of the aforementioned support frame 21. Rear ends of the side frames 31 are extended rearward over the rear end portions of the housing frames 30. Further, as shown in FIG. 3 and FIG. 4, the rear end portions of the pair of left and right side frames 31 are mutually connected in the vehicle width direction. Between the side frames 31 and the housing main body 29, flat plate-shaped footrests 33 on which feet of the occupant are placed are formed.

Next, as shown in FIG. 2, the crawler 41 is disposed inside and downward of the track housing 28. The crawler 41 is structured by including a driving wheel 42, a coupled driving wheel 43, an intermediate wheel 44, and a track belt 45 circumscribed around the respective wheels. An output of the engine 14 is transmitted to the driving wheel 42 via a later-described CVT (Continuously Variable Transmission), which enables the track belt 45 to wind around the respective wheels. When the track belt 45 winds around the respective wheels to drive the wheels, the snowmobile 10 moves forward in the traveling direction.

Meanwhile, on the front side and above the fuel tank 26, a steering handle 46 is disposed along the vehicle width direction. To both ends of the steering handle 46, grips 47 with which the occupant grips the steering handle 46 are attached. Note that the grip 47 on the right side with respect to the traveling direction is a throttle. Here, when the occupant rotates the steering handle 46 to the left or right, the rotation is transmitted to later-described skis 55, and he/she can steer the snowmobile 10. As shown in FIG. 2, the steering handle 46 is disposed on the front of the axial center 32a of the crankshaft 32 of the crankcase 15 of the engine 14. Accordingly, the occupant takes a forward-inclined riding position in order to grip the grips 47 of the steering handle 46 disposed forward, resulting that he/she takes a posture so as to embrace the fuel tank 26 and the engine 14.

Figure 5:
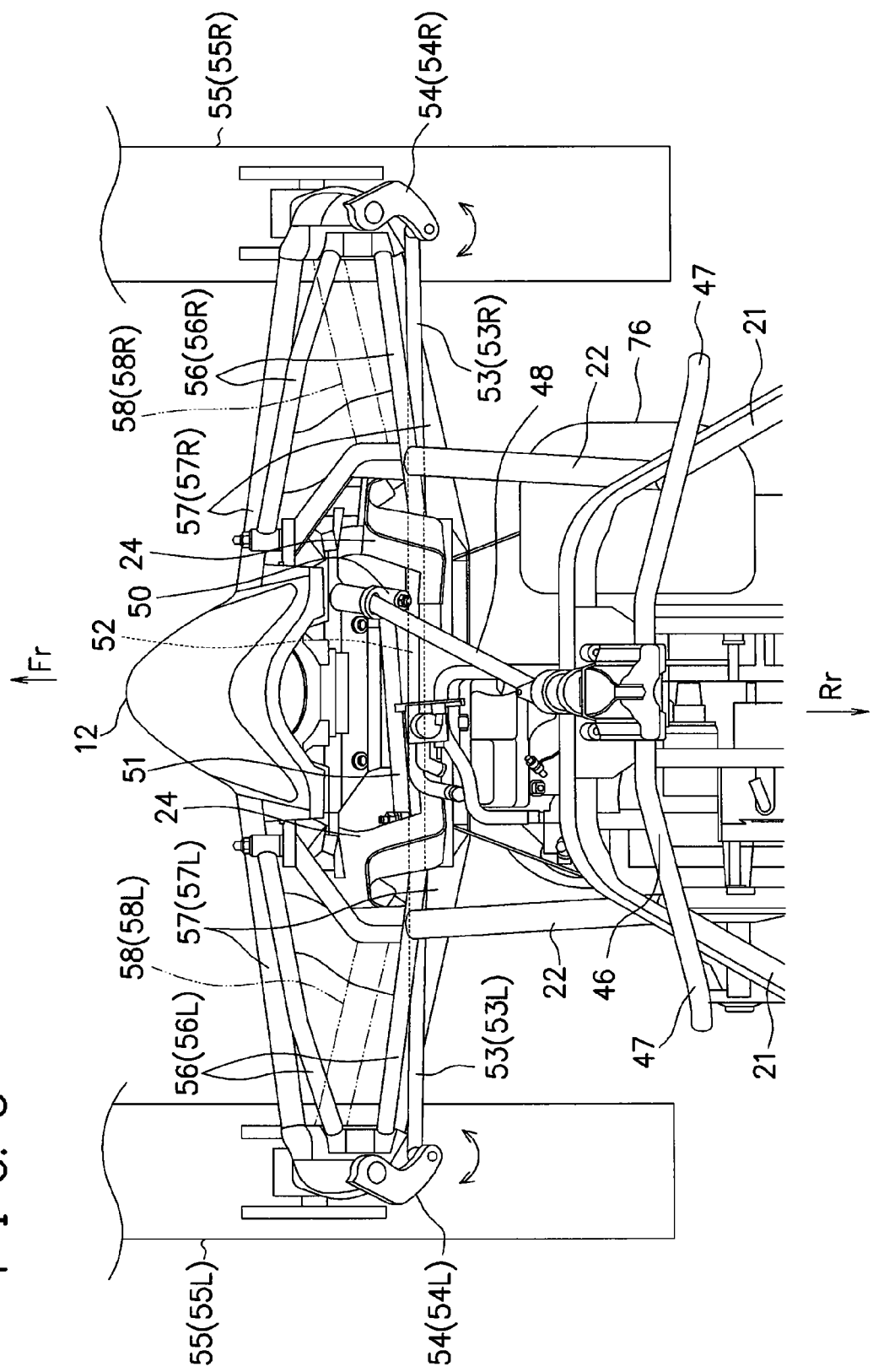
FIG. 5 is an enlarged plan view of a state in which the air box according to the present embodiment is removed.

Further, the steering handle 46 is connected to a steering mechanism. Here, a structure of the steering mechanism will be described with reference to FIG. 5. FIG. 5 is a partially enlarged view of the plan view shown in FIG. 4. The steering mechanism is structured by including a steering shaft 48, a link plate 50, a tie rod 51, a drag link 52, link bars 53 (53R, 53L), and link arms 54 (54R, 54L). The steering shaft 48 is extended forward and diagonally downward from a center of the steering handle 46. Here, as shown in FIG. 2, the steering shaft 48 is disposed to pass in front of the cylinder head 17. Further, as shown in FIG. 3, the steering shaft 48 is disposed to pass through the right side of the air box 49 disposed above the cylinder head 17 and the cylinder 16.

As shown in FIG. 5, the link plate 50 is integrally provided on a lower side of the steering shaft 48. The link plate 50 is connected to a right end portion of the tie rod 51 disposed in the vehicle width direction. A left end portion of the tie rod 51 is connected to a part of the drag link 52 (refer to dotted line shown in FIG. 5) disposed below the arm supporting members 24 and in the vehicle width direction. To both end portions of the drag link 52, the link bars 53 (53L, 53R) are connected. The link bars 53 (53L, 53R) are respectively protruded in the mutually opposite directions from the vehicle body, and connected to the link arms 54 (54L, 54R).

When the occupant rotates the steering handle 46 to the left or right, the steering shaft 48 rotates around its axis. In synchronization with the rotation, the link plate 50 also rotates to the left or right in the same manner. The tie rod 51 converts the rotation of the link plate 50 into a linear movement in the vehicle width direction. In accordance with the linear movement of the tie rod 51, the drag link 52 connected to the tie rod 51 and the link bars 53 (53L, 53R) are also moved in the same manner. Specifically, when the link bars 53 (53L, 53R) respectively move forward and backward from the vehicle body in the vehicle width direction, the link arms 54 (54L, 54R) rotate in the directions of arrow marks shown in FIG. 5.

Meanwhile, on the left and right of the front side and below the vehicle body, a pair of skis 55 (55L, 55R) are disposed along the front and rear directions. The aforementioned link arms 54 (54L, 54R) are connected to the skis 55 (55L, 55R), respectively. Therefore, when the link arms 54 (54L, 54R) rotate to the left or right, the skis 55 (55L, 55R) also rotate to the left or right in synchronization therewith. As above, when the occupant rotates the steering handle 46, the skis 55 (55L, 55R) rotate via the steering mechanism, and he/she can steer the snowmobile 10.

Further, to the pair of skis 55 (55L, 55R), upper arms 56 (56R, 56L) and lower arms 57 (57R, 57L) protruding to the left and right from the arm supporting members 24, respectively, are connected. The upper arms 56 (56R, 56L) and the lower arms 57 (57R, 57L) are structured to support the respective skis 55L, 55R at a predetermined distance from the vehicle body and to allow a vertical movement of the respective skis 55L, 55R. Further, to the pair of skis 55 (55L, 55R), shock absorbers 58 (58L, 58R) (refer to two-dot chain line shown in FIG. 5) are connected from the arm supporting members 24. The shock absorbers 58 (58L, 58R) absorb shocks in the longitudinal direction applied to the respective skis 55L, 55R.

Further, inside the cowling 11, the headlight 12 is disposed in contraposition to the cylinder head 17 in the horizontal direction as shown in FIG. 2.

Figure 6:
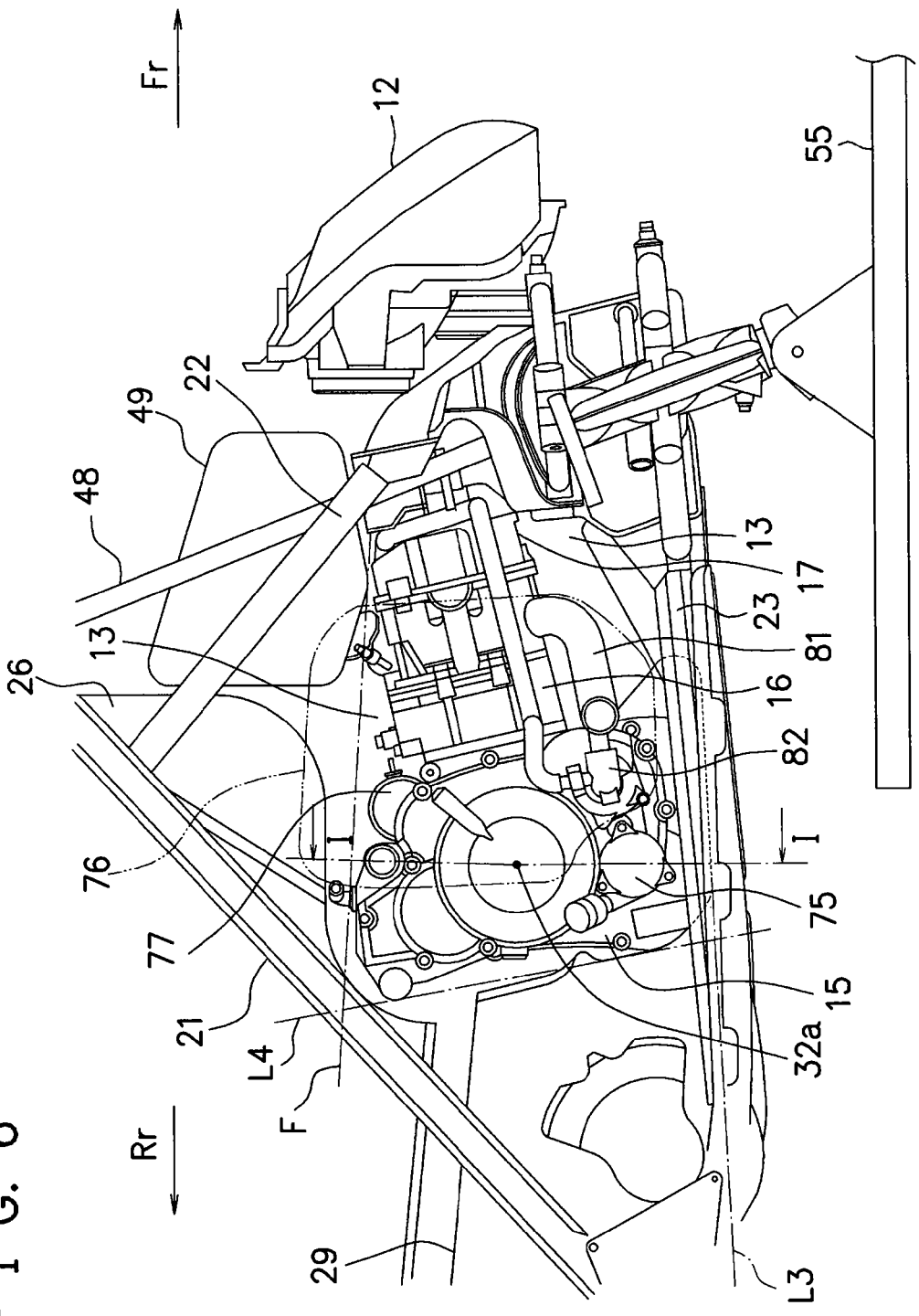
FIG. 6 is a right side view of the snowmobile in which a fuel tank according to the present embodiment is indicated by two-dot chain line.
Figure 7:
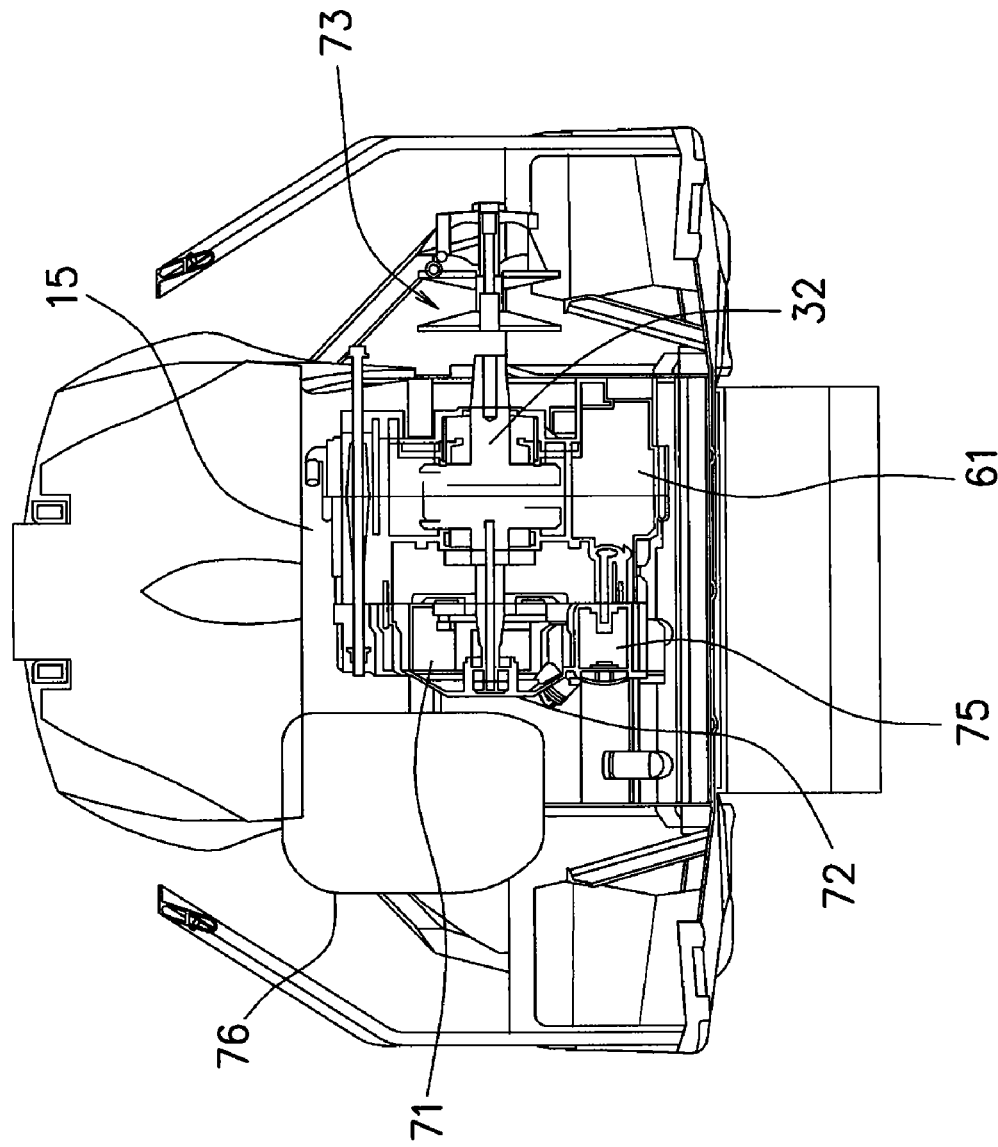
FIG. 7 is a sectional view of the snowmobile according to the present embodiment cross-sectioned along a vertical direction so as to pass through an axial center of a crankshaft.
Figure 8:
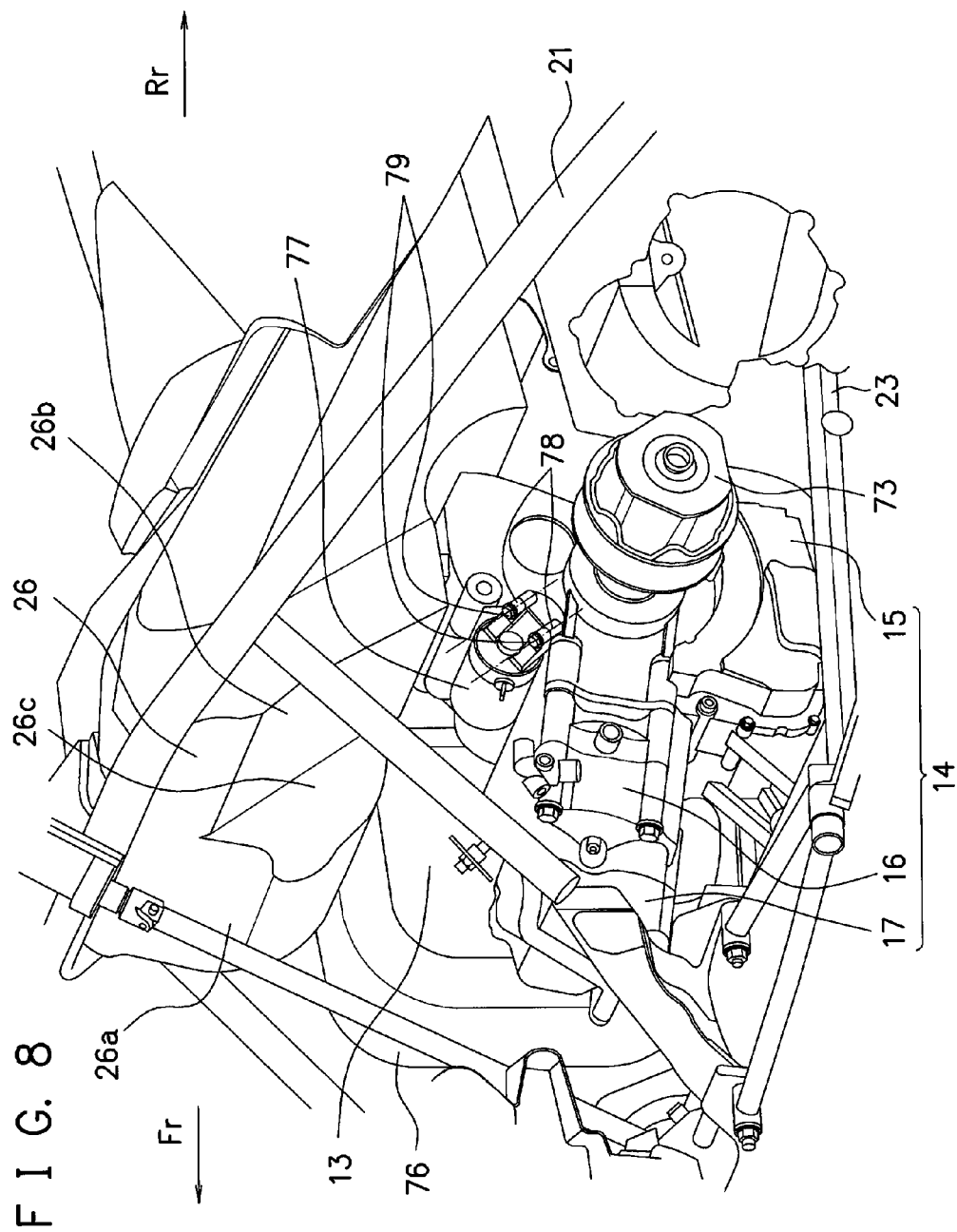
FIG. 8 is a perspective view of a periphery of an engine according to the present embodiment seen from a diagonally upward direction.
Figure 9:
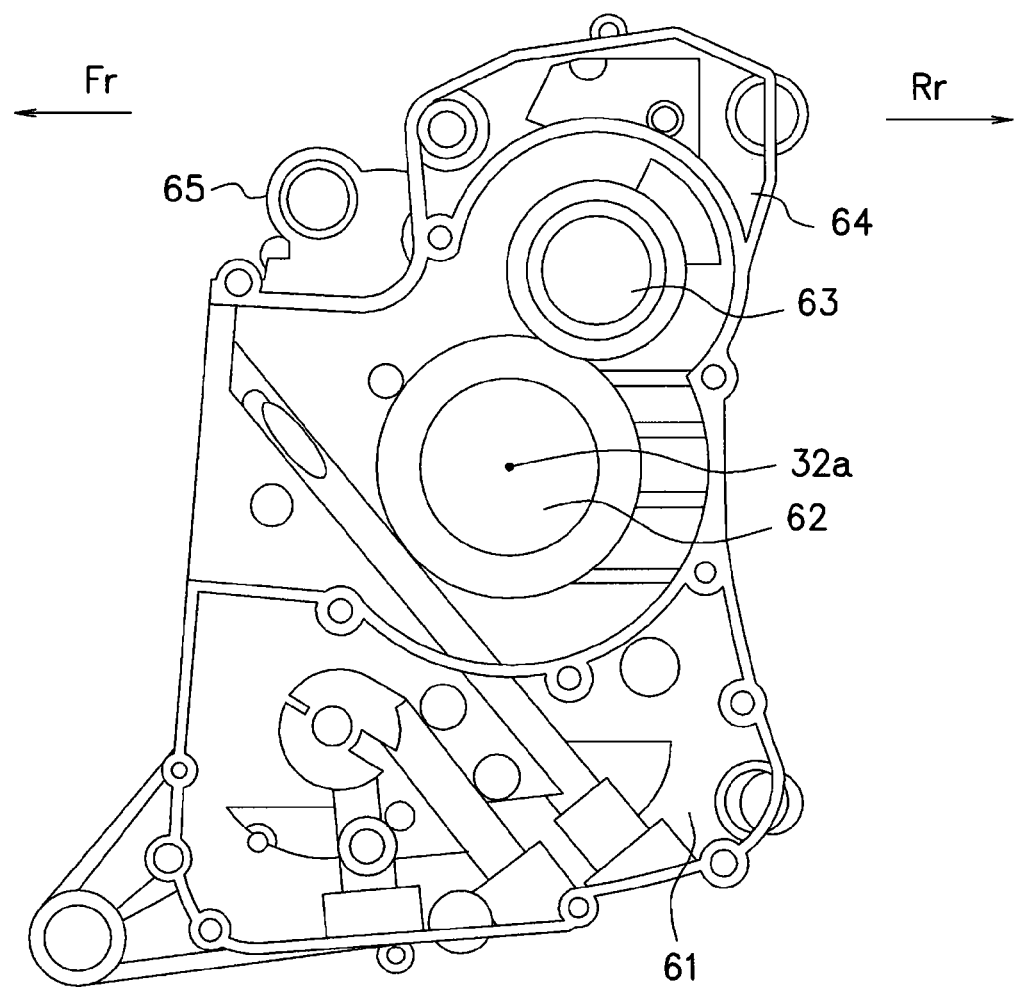
FIG. 9 is a view of a section of a crankcase according to the present embodiment.

Next, a structure of an engine and a periphery of the engine will be described with reference to FIG. 2, and FIG. 6 to FIG. 9. FIG. 6 is a right side view of the periphery of the engine. FIG. 7 is a cross section taken along the line I-I shown in FIG. 6, and is a sectional view cross-sectioned to pass through an axial center of a crankshaft. FIG. 8 is a perspective view of the periphery of the engine seen from a diagonally upward direction. Note that an air box is removed in the illustration of FIG. 8. FIG. 9 is a view of a section of a crankcase.

At first, as shown in FIG. 2, FIG. 6, and FIG. 8, the crankcase 15 is disposed at a position surrounded by the under frame 23 and the support frame 21 in the engine room 13. The crankcase 15 is protruded in both the upper and lower directions of the crankshaft 32 in side view, and the cylinder 16 is provided on substantially a center of a front portion of the crankcase 15.

Further, as shown in FIG. 7 and FIG. 9, an oil pan 61 is formed on a lower portion in the crankcase 15. Here, since the cylinder axis C of the cylinder 16 is inclined by an angle of substantially 10 degrees with respect to the horizontal plane, an oil lubricating inside the engine 14 is set to return to the oil pan 61 because of gravity. Further, as shown in FIG. 7, above the oil pan 61 and at the center of the crankcase 15, the crankshaft 32 is extended in the vehicle width direction. A flywheel is attached to the crankshaft 32, and the crankshaft 32 is connected to a piston via a connecting rod.

In the crankcase 15, a housing 62 capable of housing the crankshaft 32, the flywheel and the like in a rotatable manner is formed, as shown in FIG. 9. Further, a balancer shaft housing 63 that houses a shaft of a balancer is formed rearward and diagonally upward of the axial center 32a of the crankshaft 32. Further, above the balancer shaft housing 63, an oil separation chamber 64 of breather is formed.

Further, in the cylinder 16 and the cylinder head 17, not-shown piston, inlet valve, exhaust valve, ignition plug and the like are disposed.

Next, as shown in FIG. 7, on a right end portion of the crankshaft 32 disposed in the crankcase 15 and on a side surface of the crankcase 15, a magneto device 71 is provided. The magneto device 71 is covered by a magneto cover 72 from the right side of the crankcase 15.

Meanwhile, on a left end portion of the crankshaft 32 disposed in the crankcase 15, a CVT mechanism 73 is disposed, as shown in FIG. 7. The CVT mechanism 73 transmits a rotation of the crankshaft 32 to the aforementioned driving wheel 42 after changing a speed reduction ratio in accordance with the rotation speed.

Further, on the right side of the crankcase 15, an oil filter 75 is disposed. The oil filter 75 is positioned below the aforementioned magneto cover 72, and is attached in a manner that an attachment surface thereof is directed in the lateral direction. Here, the position at which the oil filter 75 is disposed will be more concretely described with reference to FIG. 6. Note that FIG. 6 illustrates the muffler 76 disposed on the right side of the crankcase 15 and the cylinder 16 by two-dot chain line so that the periphery of the engine 14 can be visually recognized.

As shown in FIG. 6, the oil filter 75 is disposed below the axial center 32a of the crankshaft 32. Further, the oil filter 75 is disposed to be positioned above a lower end of the crankcase 15 (refer to virtual line L3 shown in FIG. 6) and on the front of a rear end of the crankcase 15 (refer to virtual line L4 shown in FIG. 6). The oil filter 75 filters the oil in the oil pan 61 pumped up by a not-shown oil pump. The filtered oil is supplied again to the respective parts in the engine 14.

As described above, the oil filter 75 is disposed in a space below the magneto cover 72, which is a dead space, so that it is possible to reduce a protrusion amount in the vehicle width direction, resulting that a width size of the engine 14 can be reduced. Further, the oil filter 75 is not disposed on a lower surface of the engine 14 (crankcase 15), so that when the engine 14 is inclined forward, the engine 14 can be disposed along a bottom part of the vehicle body while being close to the bottom part, and accordingly, it is possible to lower the gravity center of the vehicle body. Further, the oil filter 75 is not disposed on an upper surface of the engine (crankcase 15), so that when the engine 14 is inclined forward, other auxiliary machines can be efficiently disposed above the engine 14, which enables to downsize the entire engine 14.

Further, as shown in FIG. 6, a portion of the muffler 76 corresponding to the oil filter 75, namely, a portion of the lower side and rear side of the muffler 76 is formed by being cut out. Therefore, an operator can perform an exchange work of the oil filter 75 from the lateral direction of the vehicle body without interfering with the other component parts such as the muffler 76, resulting that the maintainability is enhanced. Note that the oil filter 75 according to the present embodiment is one of a so-called filter type in which a filter part (filter) and a housing are separately provided. Therefore, the filter is exchanged after removing a cover of the oil filter 75 from the lateral direction.

Further, as shown in FIG. 6, on the right side of the crankcase 15 and on the front of the oil filter 75, a water pump 82 is disposed. The water pump 82 supplies cooling water to a not-shown water jacket formed in the cylinder 16. Note that the cooling water that cools the cylinder 16 passes through a not-shown pipe disposed in the housing main body 29, and is then supplied to the cylinder 16 again. Note that the cooling water is cooled by snow splashed by the track belt 45 while passing through the pipe in the housing main body 29.

Further, as shown in FIG. 2 and FIG. 6, a starter motor 77 is disposed at a position surrounded by the air box 49, the fuel tank 26, and the engine 14. More concretely, the starter motor 77 is disposed above and on the front of the axial center 32a of the crankshaft 32 of the crankcase 15. Further, the starter motor 77 is disposed at a position not protruding upward from a virtual plane F shown in FIG. 6 connecting an upper end portion of the crankcase 15 and an upper end portion of the cylinder head 17. In other words, the starter motor 77 is disposed on a V-shaped groove or recessed portion formed by the crankcase 15 and the cylinder 16. The starter motor 77 starts the engine 14 by rotating the crankshaft 32 via a not-shown idler gear in the crankcase 15.

When the starter motor 77 is disposed at the position as described above, it does not protrude upward, so that the crankcase 15, the air box 49, and the fuel tank 26 can be disposed while being close to one another. Further, the starter motor 77 is not disposed on the lower surface of the engine 14 (crankcase 15), so that when the engine 14 is inclined forward, the engine 14 can be disposed along the bottom part of the vehicle body while being close to the bottom part, and accordingly, it is possible to lower the gravity center of the vehicle body.

Further, as shown in FIG. 8, in the starter motor 77, a pair of mounting bosses 78 for fixing the starter motor 77 to the crankcase 15 are provided. The starter motor 77 is fixed by mounting bolts 79 via the mounting bosses 78. Further, axial centers of the mounting bosses 78 are inclined diagonally upward. Here, if attention is paid to the fuel tank 26 disposed above the starter motor 77, the front side lower portion of the fuel tank 26 has a right side portion 26a being on the right side with respect to the traveling direction and a left side portion 26b below which the starter motor 77 is positioned, the portions having different shapes. At first, the right side portion 26a is formed by being bulged toward an upper portion of the engine 14. Meanwhile, the left side portion 26b is also formed by being bulged toward the upper portion of the engine 14, but, a recessed portion 26c formed so as to cut out a part of the bulged portion is formed on the left side portion 26b. The aforementioned axial centers of the mounting bosses 78 of the starter motor 77 are directed to the recessed portion 26c of the fuel tank 26. Specifically, it is designed such that axial center directions of the mounting bosses 78 (refer to two-dot chain line shown in FIG. 8) do not pass through the fuel tank 26.

The starter motor 77 and the fuel tank 26 are structured as described above, so that when the operator performs the maintenance such as exchanging the starter motor 77, he/she can access the mounting bosses 78 of the starter motor 77 from the front of and above the vehicle body only by removing the air box 49. Specifically, since the operator is only required to access the starter motor 77 along the recessed portion 26c of the fuel tank 26, he/she can conduct the maintenance of the starter motor 77 without removing the fuel tank 26.

Next, the gravity center position of engine Ge and the gravity center position of vehicle body including occupant Gc of the snowmobile 10 will be described with reference to FIG. 1. At first, as shown in FIG. 1, the gravity center position of the engine 14 according to the present embodiment is shifted forward as compared to the conventional gravity center position since the cylinder axis C is inclined forward. However, both the fuel tank 26 and the saddle type seat 27 are moved forward so that they are disposed to be close to the engine 14. Accordingly, the occupant who sits on the saddle type seat 27 takes a riding position so that he/she is also close to the engine 14. Besides, the steering handle 46 is disposed on the front of the axial center of the crankshaft 32, and the steering shaft 48 is disposed to pass through the front of the cylinder head 17, so that the occupant takes a forward-inclined riding position. Therefore, the gravity center position of vehicle body including occupant Gc is significantly shifted forward as compared to the conventional gravity center position.

As described above, in the snowmobile 10 according to the present embodiment, since the gravity center position Ge of the engine and the gravity center position of vehicle body including occupant Gc can be close to each other as shown in FIG. 1, it is possible to remarkably improve the driving stability of the vehicle body during the steering.

Further, the position at which the oil filter 75 is disposed also largely contributes to the reason why the gravity center position of engine Ge and the gravity center position of vehicle body including occupant Gc can be close to each other. Specifically, as described above, the oil filter 75 is disposed in a space below the magneto cover 72, which is a dead space, so that it is positioned above the lower end of the crankcase 15 and on the front of the rear end of the crankcase 15. Specifically, the oil filter 75 does not protrude around the crankcase 15, so that the vehicle body and the engine 14 can be close to each other, and the air box 49, the CVT mechanism 73 and the like in addition to the fuel tank 26 can be close to the engine 14. Accordingly, as described above, the gravity center position of engine Ge and the gravity center position of vehicle body including occupant Gc can be close to each other.

Further, the position at which the starter motor 77 is disposed also largely contributes to the reason why the gravity center position of engine Ge and the gravity center position of vehicle body including occupant Gc can be close to each other. Specifically, the starter motor 77 is disposed above and on the front of the axial center 32a of the crankshaft 32 of the crankcase 15. Further, the starter motor 77 is disposed at a position not protruding upward from the virtual plane F shown in FIG. 6 connecting the upper end portion of the crankcase 15 and the upper end portion of the cylinder head. Specifically, the starter motor 77 does not protrude above the engine 14, so that the fuel tank 26 can be close to the engine 14. Accordingly, as described above, the gravity center position of engine Ge and the gravity center position of vehicle body including occupant Gc can be close to each other.

Figure 10:
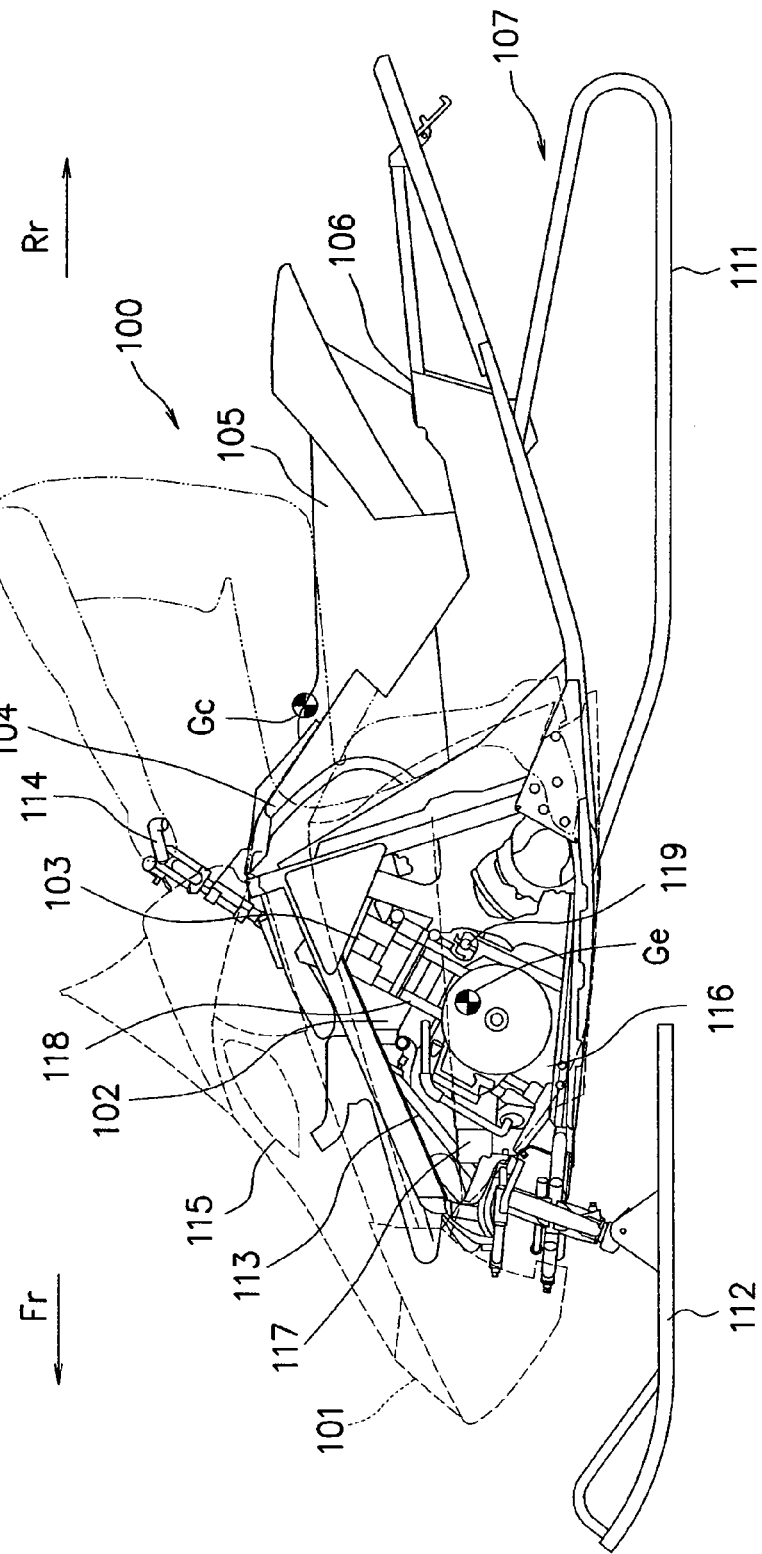
FIG. 10 is a left side view of a conventional snowmobile.

Further, since the engine 14 and the periphery of the engine 14 are disposed as described above, the riding position of the occupant is inclined forward as shown in FIG. 1, as compared with FIG. 10. Accordingly, since a forward visibility when riding on the snowmobile is secured, the occupant can recognize a state of a road surface right in front of the vehicle. Therefore, even when the snowmobile travels over mountains and the like being unleveled land, the safety is improved.

Further, since the cylinder axis C of the engine is inclined forward and the steering shaft is disposed on the front of the cylinder head, the engine room having an engine main body as a base can be formed behind the steering shaft, resulting that the gravity center of the engine can be lowered and can be close to the gravity center of vehicle body. Therefore, it is possible to remarkably improve the driving stability of the vehicle body.

Further, in particular, since the steering handle is disposed on the front of a vertical plane L2 passing through the axial center of the crankshaft, the occupant takes a riding position so as to embrace the engine, which enables to easily perform the control of the vehicle body. Further, the fuel tank can be disposed forward of the vehicle body until it overlaps with the crankcase, so that a concentration of mass can be realized.

According to the riding position with such a layout, it is possible to secure the forward visibility and to recognize the state of the road surface right in front of the vehicle, so that the safety at the time of traveling over mountains and the like being unleveled land is improved.

Further, for example, the headlight is disposed in contraposition to the cylinder head, so that the headlight can illuminate a position right in front of the snowmobile in the traveling direction, which provides an effect such that the visibility is further secured.

Further, the engine 14 is mounted by inclining the cylinder axis C thereof forward, and the oil filter 75 is disposed below the axial center 32a of the crankshaft 32 in side view, so that the exchange work of the oil filter 75 can be conducted easily, and the maintainability can be enhanced. Further, since the oil filter 75 is disposed on the side surface of the engine 14 being the opposite side to the side on which the CVT mechanism 73 of the engine 14 is disposed, it does not protrude to the CVT mechanism 73 side, and accordingly, the CVT mechanism 73 can be disposed close to the engine 14.

Further, since the oil filter 75 is disposed below the magneto cover 72 covering the magneto device 71, the dead space below the magneto cover 72 can be effectively utilized and the protrusion amount in the lateral direction of the engine 14 is reduced, resulting that the size of the engine 14 in the width direction can be reduced. Further, the oil filter 75 is not disposed on the lower surface of the engine 14, so that when the engine 14 is inclined forward, the engine 14 can be disposed along the bottom part of the vehicle body while being close to the bottom part, and accordingly, it is possible to lower the gravity center of the vehicle body. Further, the oil filter 75 is not disposed on the upper surface of the engine 14, so that when the engine 14 is inclined forward, the other auxiliary machines can be efficiently disposed above the engine 14, which enables to downsize the entire engine 14.

Further, the engine 14 is mounted by inclining the cylinder axis C thereof forward, and the starter motor 77 is disposed on the front of and above the axial center 32a of the crankshaft 32 in side view, so that it is possible to conduct the maintenance of the starter motor 77 from the above the vehicle body. Further, since the starter motor 77 is disposed at a position surrounded by the air box 49, the fuel tank 26, and the engine 14, it is possible to protect the starter motor 77 from snow and rainwater.

Further, since the recessed portion 26c is formed on the fuel tank 26 and the mounting bosses 78 for fixing the starter motor 77 are formed by being directed to the recessed portion 26c, it is possible to conduct the maintenance such as removing the starter motor 77, without removing the fuel tank 26. Further, the starter motor 77 is disposed at a position not protruding upward from the virtual plane F connecting the upper end portion of the crankcase 15 of the engine 14 and the upper end portion of the cylinder head 17 of the engine 14, which provides a multiplied effect such that the gravity center of the engine 14 can be lowered and a capacity of the adjacent fuel tank 26 can be secured, in addition to enabling the downsizing of the engine 14.

Note that although the aforementioned embodiment described a case in which the steering shaft 48 is disposed to pass through the right side of the air box 49, it is not limited to the above case. For instance, it is also possible that a recessed portion is formed on the air box 49, and the steering shaft 48 is disposed to pass through the recessed portion.

Further, although the aforementioned embodiment described a case in which the air box 49 is disposed on the front of the fuel tank 26, it is not limited to the above case. For instance, it is also possible that the air box is disposed above the engine, and the fuel tank is disposed above the air box.

Further, although the aforementioned embodiment described a case in which the headlight 12 is disposed in contraposition to the cylinder head 17, it is not limited to the above case. For instance, it is also possible that the headlight is disposed on the front of the steering handle 46 and above the air box 49.

Further, although the aforementioned embodiment described a case in which the single-cylinder engine is used, it is not limited to the above case. For instance, it is also possible to use a two-cylinder engine. In this case, the engine is structured such that a cylinder axis C thereof is inclined forward as described above, and two pistons are positioned in parallel in the vehicle width direction. At this time, the aforementioned steering shaft 48 is only required to be disposed to pass through a dent formed between cylinder heads that respectively correspond to the two pistons, for example, and accordingly, it is quite possible to apply even the two-cylinder engine.

Further, although the aforementioned embodiment described a case in which the oil filter 75 of the filter type is used, it is not limited to the above case. For instance, it is also possible to use an oil filter of a so-called cartridge type in which a filter is integrally formed in a housing.

Further, although the aforementioned embodiment described a case in which the oil filter 75 is disposed on the right side of the crankcase 15, it is not limited to the above case. For instance, it is also possible that the oil filter is disposed downward of the vehicle body. Note that also in this case, by disposing the oil filter so as not to protrude from the lower end of the crankcase 15, it is possible to achieve the same effect as that of the aforementioned embodiment.

Further, although the aforementioned embodiment described, using FIG. 9, the crankcase 15 in which the oil separation chamber 64 of breather is integrally formed above the balancer shaft housing 63, it is not limited to this. For instance, it is also possible that the balancer shaft housing and the oil separation chamber of the crankcase are separately structured, and the oil separation chamber is disposed above the balancer shaft housing. Note that in this case, by disposing the starter motor 77 at a position not protruding upward from a virtual plane connecting an upper end portion of the oil separation chamber and the upper end portion of the cylinder head 17, it is possible to achieve the same effect as that of the aforementioned embodiment.

What is claimed is:

1. A snowmobile comprising:
a pair of left and right skis on a front side of a vehicle body,
a steering shaft disposed on a front of a saddle seat for steering the skis,
an engine mounted in a cowling that covers the front side of the vehicle body,
an air box disposed above the cylinder head of the engine,
a fuel tank disposed above a crankcase of the engine, and
a crawler disposed below the saddle seat in a rear side of the vehicle body for driving the snowmobile,
wherein the engine is mounted by inclining a cylinder axis thereof forward so that a cylinder head of the engine is positioned below a horizontal line passing through an upper end of a track housing that covers the crawler, in side view;
the steering shaft is disposed on the front of the cylinder head of the engine;
an upper end of the steering shaft is disposed on the front of a vertical line passing through an axial center of a crankshaft of the engine, in side view;
the fuel tank is disposed on a front side of the saddle seat; and
the air box is disposed on a front side of the fuel tank with a portion of the air box being disposed on a front side of the steering shaft.

2. The snowmobile according to claim 1, wherein
a steering handle attached to an upper end of the steering shaft is disposed on the front of a vertical line passing through an axial center of a crankshaft of the engine, in side view.

3. The snowmobile according to claim 1, wherein
a headlight is disposed on the front of the cylinder head of the engine, in contraposition to the cylinder head.

4. An engine for a snowmobile, said snowmobile comprising:
a pair of left and right skis on a front side of a vehicle body,
a steering shaft disposed on a front of a saddle seat for steering the skis,
an air box disposed above the cylinder head of the engine,
a fuel tank disposed above a crankcase of the engine, and
a crawler disposed below the saddle seat in a rear side of the vehicle body for driving the snowmobile,
wherein said engine is mounted in a cowling that covers the front side of the vehicle body by inclining a cylinder axis thereof forward so that a cylinder head of the engine is positioned below a horizontal line passing through an upper end of a track housing that covers the crawler, in side view, an oil filter is disposed below an axial center of a crankshaft in side view;
an upper end of the steering shaft is disposed on the front of a vertical line passing through an axial center of a crankshaft of the engine, in side view;
the fuel tank is disposed on a front side of the saddle seat; and
the air box is disposed on a front side of the fuel tank with a portion of the air box being disposed on a front side of the steering shaft.

5. The engine according to claim 4, wherein
an attachment surface of the oil filter is formed by being directed in the lateral direction.

6. The engine for snowmobile according to claim 4, wherein
a steering handle attached to an upper end of the steering shaft is disposed on the front of the vertical line passing through an axial center of a crankshaft of the engine, in side view.

7. An engine for a snowmobile, said snowmobile comprising:
a pair of left and right skis on a front side of a vehicle body,
a steering shaft disposed on a front of a saddle type seat for steering the skis, and
a crawler disposed below the saddle seat in a rear side of the vehicle body for driving the snowmobile,
wherein said engine is mounted in a cowling that covers the front side of the vehicle body by inclining a cylinder axis thereof forward so that a cylinder head of the engine is positioned below a horizontal line passing through an upper end of a track housing that covers the crawler, in side view;
an oil filter is disposed on a side surface of said engine being an opposite side to a side on which a Continuously Variable Transmission of said engine is disposed; and
an upper end of the steering shaft is disposed on the front of a vertical line passing through an axial center of a crankshaft of the engine, in side view.

8. An engine for a snowmobile, said snowmobile comprising:
a pair of left and right skis on a front side of a vehicle body,
a steering shaft disposed on a front of a saddle seat for steering the skis, and
a crawler disposed below the saddle seat in a rear side of the vehicle body for driving the snowmobile,
wherein said engine is mounted in a cowling that covers the front, side of the vehicle body by inclining a cylinder axis thereof forward so that a cylinder head of the engine is positioned below a horizontal line passing through an upper end of a track housing that covers the crawler, in side view;
a magneto device is disposed on a side surface of said engine being an opposite side to a side on which a Continuously Variable Transmission of said engine is disposed;
an oil filter is disposed below a magneto cover that covers the magneto device; and
an upper end of the steering shaft is disposed on the front of a vertical line passing through an axial center of a crankshaft of the engine, in side view.

9. An engine for a snowmobile, said snowmobile comprising:
a pair of left and right skis on a front side of a vehicle body,
a steering shaft disposed on a front of a saddle seat for steering the skis, and
a crawler disposed below the saddle seat in a rear side of the vehicle body for driving the snowmobile,
wherein said engine is mounted in a cowling that covers the front side of the vehicle body by inclining a cylinder axis thereof forward so that a cylinder head of the engine is positioned below a horizontal line passing through an upper end of a track housing that covers the crawler, in side view;
a magneto device is disposed on a side surface of said engine being an opposite side to a side on which a Continuously Variable Transmission of said engine is disposed;
an oil filter is disposed below a magneto cover that covers the magneto device;

an attachment surface of the oil filter is formed by being directed in the lateral direction; and an upper end of the steering shaft is disposed on the front of a vertical line passing through an axial center of a crankshaft of the engine, in side view.

10. An engine for a snowmobile, said snowmobile comprising:

a pair of left and right skis on a front side of a vehicle body,
a steering shaft disposed on a front of a saddle seat for steering the skis,
an air box disposed above the cylinder head of the engine,
a fuel tank disposed above a crankcase of the engine, and
a crawler disposed below the saddle seat in a rear side of the vehicle body for driving the snowmobile,
wherein said engine is mounted in a cowling that covers the front side of the vehicle body by inclining a cylinder axis thereof forward so that a cylinder head of the engine is positioned below a horizontal line passing through an upper end of a track housing that covers the crawler, in side view;
a starter motor is disposed on the front of and above an axial center of a crankshaft in side view;
an upper end of the steering shaft is disposed on the front of a vertical line passing through an axial center of a crankshaft of the engine, in side view;,
the fuel tank is disposed on a front side of the saddle seat; and
the air box is disposed on a front side of the fuel tank with a portion of the air box being disposed on a front side of the steering shaft.

11. The engine for snowmobile according to claim 10, wherein a steering handle attached to an upper end of the steering shaft is disposed on the front of the vertical line passing through an axial center of a crankshaft of the engine, in side view.

12. An engine for a snowmobile, said snowmobile comprising:

a pair of left and right skis on a front side of a vehicle body,
a steering shaft disposed on a front of a saddle seat for steering the skis,
an air box is disposed above a cylinder head of said engine,
a fuel tank is disposed above a crankcase of said engine, and
a crawler disposed below the saddle seat in a rear side of the vehicle body for driving the snowmobile,
wherein said engine is mounted in a cowling that covers the front side of the vehicle body by inclining a cylinder axis thereof forward so that a cylinder head of the engine is positioned below a horizontal line passing through an upper end of a track housing that covers the crawler, in side view;
a starter motor is disposed at a position surrounded by the air box, the fuel tank, and said engine; and
an upper end of the steering shaft is disposed on the front of a vertical line passing through an axial center of a crankshaft of the engine, in side view.

13. An engine for a snowmobile, said snowmobile comprising:

a pair of left and right skis on a front side of a vehicle body,
a steering shaft disposed on a front of a saddle seat for steering the skis, and
a crawler disposed below the saddle seat in a rear side of the vehicle body for driving the snowmobile,
wherein said engine is mounted in a cowling that covers the front side of the vehicle body by inclining a cylinder axis thereof forward so that a cylinder head of the engine is positioned below a horizontal line passing through an upper end of a track housing that covers the crawler, in side view;
a starter motor is disposed on the front of and above an axial center of a crankshaft in side view;
a fuel tank is disposed above said engine, a recessed portion is formed on the fuel tank, and mounting bosses for fixing the starter motor are formed by being directed to the recessed portion; and
an upper end of the steering shaft is disposed on the front of a vertical line passing through an axial center of a crankshaft of the engine, in side view.

14. An engine for a snowmobile, said snowmobile comprising:

a pair of left and right skis on a front side of a vehicle body,
a steering shaft disposed on a front of a saddle seat for steering the skis,
an air box is disposed above a cylinder head of said engine,
a fuel tank is disposed above a crankcase of said engine, and
a crawler disposed below the saddle seat in a rear side of the vehicle body for driving the snowmobile,
wherein said engine is mounted in a cowling that covers the front side of the vehicle body by inclining a cylinder axis thereof forward so that a cylinder head of the engine is positioned below a horizontal line passing through an upper end of a track housing that covers the crawler, in side view;
a starter motor is disposed at a position surrounded by the air box, the fuel tank, and said engine;
a recessed portion is formed on the fuel tank, and mounting bosses for fixing the starter motor are formed by being directed to the recessed portion; and
an upper end of the steering shaft is disposed on the front of a vertical line passing through an axial center of a crankshaft of the engine, in side view.

15. An engine for a snowmobile, said snowmobile comprising:

a pair of left and right skis on a front side of a vehicle body,
a steering shaft disposed on a front of a saddle seat for steering the skis, and
a crawler disposed below the saddle seat in a rear side of the vehicle body for driving the snowmobile,
wherein said engine is mounted in a cowling that covers the front side of the vehicle body by inclining a cylinder axis thereof forward so that a cylinder head of the engine is positioned below a horizontal line passing through an upper end of a track housing that covers the crawler, in side view; a starter motor is disposed at a position not protruding upward from a virtual plane connecting an upper end portion of the crankcase of said engine and an upper end portion of the cylinder head of said engine; and an upper end of the steering shaft is disposed on the front of a vertical line passing through an axial center of a crankshaft of the engine, in side view.

* * * * *